| United States Patent [19] | [11] | 4,184,998 |
|---|---|---|
| Shippy et al. | [45] | Jan. 22, 1980 |

[54] NON ODOROUS SILANE COUPLING AGENT

[75] Inventors: Ronald L. Shippy, Wadsworth; Shamim Ahmad, Canal Fulton, both of Ohio

[73] Assignee: The B. F. Goodrich Company, Akron, Ohio

[21] Appl. No.: 856,061

[22] Filed: Nov. 30, 1977

[51] Int. Cl.$^2$ ............................ C07F 7/10; C07F 7/18
[52] U.S. Cl. .......................... 260/42.15; 260/448.8 R; 260/448.2 N
[58] Field of Search ................. 260/448.8 R, 448.2 N, 260/42.15

[56] References Cited

U.S. PATENT DOCUMENTS 4,072,701  2/1978  Pletka et al. ................. 260/448.8 R

*Primary Examiner*—Paul F. Shaver
*Attorney, Agent, or Firm*—Joe A. Powell

[57] ABSTRACT

Bonding of rubber or other plastics to mineral reinforcements such as silica pigment is brought about by a mercapto alkyl silane without production of foul odors from the mercapto compound by preliminary reversible coupling of the mercapto compound with a material capable of addition reaction such as toluene diisocyanate.

8 Claims, No Drawings

NON ODOROUS SILANE COUPLING AGENT

BACKGROUND

It is well known that certain functionally substituted silanes, such as aminoalkyl or glycidoxy-alkyl silanes, when added to rubber compositions containing reinforcing grade mineral pigments, substantially increase the strength and resilience of the vulcanized rubber product. A preferred material for such purposes is 3-mercaptopropyl trimethoxysilane added in a small proportion to a vulcanizable rubber composition containing a reinforcing grade silica pigment. The function of the added material is believed to be the bonding of the pigment surface to the rubber matrix, by chemical linking of one end of the molecule to the pigment and the other end to the rubber.

Although terminal functional groups other than the mercapto group in a silane compound have been found to be effective in enhancing the strength and resilience of rubber containing silica or other mineral pigments, the best results are obtained with mercapto substituted compounds and particularly 3-mercaptopropyl trimethoxy silane. Unfortunately, all of these functionally substituted silanes are somewhat volatile, and tend to flash off and be lost during normal mixing in Banbury mixers, in which considerable heat is generated. This not only involves loss of an expensive material, but also creates problems because of the toxicity of the silanes.

In addition, the preferred 3-mercaptopropyl trimethoxy silane and other mercaptosilanes exhibit the characteristic property of mercaptans, of having a very objectionable foul odor, particularly at the relatively high temperatures at which rubber compositions are ordinarily mixed. The odor problem in the factories has seriously limited the use of these materials and the achievement of the highly desirable improvement in strength and resilience which they produce.

SUMMARY OF THE INVENTION

It has been found that the loss of these materials into the ambient atmosphere and the objectionable foul odor of the mercaptosilanes such as 3-mercaptopropyl trimethoxy silane can be essentially eliminated by preliminary reaction with another material which will bind the mercaptan sulfur to produce a blocked product but one which will still retain the ability to react with rubber under vulcanizing conditions.

Reactions are known which will temporarily block active functional groups, for convenience in handling various kinds of functionally reactive ingredients. For example, it is known that isocyanate esters can undergo a preliminary reaction with various other materials to produce "blocked isocyanates" which are essentially unreactive under mixing conditions but when heated to a higher temperature will react as though the isocyanate were present in its original condition.

In this invention a quite different purpose is involved. It is not blocking of chemical activity, as is the case with blocked isocyanates. Instead, it is elimination of volatility, to prevent losses b evaporation, and to eliminate the intolerably foul odor.

To accomplish this purpose, the functionally substituted silane is converted to an essentially non-volatile addition compound, which can be mixed into rubber at reasonable mixing temperatures without significant loss, and therefore also without significant hazard to personnel and with almost complete elimination of the odor problem.

Nevertheless, at the higher vulcanization temperature the addition compound behaves as though the silane constituent were present in its free form, and all of the benefits of increased strength and resilience for which the silane is used are obtained without noticeable change.

The added material forming the addition compound with the functionally substituted silane is preferably an organic isocyanate and particularly the well known toluene diisocyanate which is widely used in making the so-called "blocked isocyanate" by mixing it with such a material as a phenol to form an adduct which is stable at room temperature but which behaves like free isocyanate at plastics molding temperatures.

Although an isocyanate is presently preferred, such as any of the organic isocyanates commonly used in producing polyurethane plastics, and particularly toluene diisocyanate, other compounds can be used which form similar adducts which are stable at moderate temperatures such as are produced in mixing operations but which are reactive at vulcanization temperatures, such as the aryl carbodiimides, for example.

In this invention a functionally substituted alkyl silane is mixed with at least equivalent proportions of a material capable of a simple addition reaction with the silane compound. Preferably an excess of the blocking material is used, up to about two equivalents of the quantity theoretically needed to block every mercaptan group.

The materials ordinarily react immediately when mixed, but slight warming or use of a mutual solvent may sometimes be helpful.

The blocked functionally substituted silane so produced is then mixed into the rubber or other plastic together with the mineral pigment or other reinforcing material which is to be bound to the plastic matrix.

It is found that problems created by volatilization of the silane material during the mixing operation are substantially eliminated. Nevertheless, the desired bonding of the rubber or other matrix with the mineral pigment or other reinforcing material is achieved without change.

The quantity of blocked mercapto silane which is mixed with a particular rubber composition can be the quantity containing the same amount of mercapto silane which would have been used if the mercapto silane were to be used without such pretreatment. It will ordinarily depend primarily on the amount of reinforcing silica pigment which is used, but to some extent will depend on the total amount and grade of all reinforcing pigments. The greater the active surface, the more should be used for maximum effectiveness. For reinforcing grades of silica now generally available, the quantity can suitably be from one half percent to ten percent of the weight of silica pigment or of comparable mineral pigments.

EXAMPLE

In a preferred embodiment of this invention, at least an equivalent quantity of an isocyanate ester such as toluene diisocyanate is reacted with 3-mercapto-propyl trimethoxy silane. Preferably equal weights of the two materials are mixed. The liquid mercapto compound thereby becomes transformed into a solid addition compound, which is essentially non-volatile and almost free from objectionable odor. Nevertheless, the product retains its ability to bond a rubber matrix to the surface of silica pigment particles or of other reinforcing mineral pigments.

Although a solvent is not necessary for the reaction, a solvent such as alcohol may be used if desired, and the adduct may be added to rubber as a solution, with the solvent evaporated during the mixing operation.

Specifically, a rubber mix is prepared, typically one suitable for use in tire treads or other products subject to abrasive wear, containing for each hundred parts of natural or synthetic rubber 40 parts of super abrasion furnace black and 17 parts of reinforcing hydrated silica pigment (such as HiSil 210 supplied by PPG Industries) along with 0.75 parts of the addition compound mentioned above, together with conventional proportions of sulfur, vulcanization accelerator, and zinc oxide for vulcanization, and other minor ingredients such as processing aids and anti-oxidants.

The mixing proceeds normally, but without the vaporization and the intensely foul odor previously observed when 3-mercapto-propyl trimethoxy silane was mixed into rubber. Moreover, when vulcanized specimens of this mix and of one containing the same ingredients except that the 3-mercaptopropyl trimethoxysilane and toluene diisocyanate are not present, the rubber containing the addition compound of these two materials is found to have a 20% improvement in pico abrasion index, 10% reduction in heat buildup, and 20% increase in 300% modulus. This indicates that the mercaptosilane is retained in the vulcanized product and performs its intended function of bonding the pigments and particularly the fine particles of silica to the rubber matrix, notwithstanding the temporary combination with the isocyanate.

Similar results can be obtained with other mercaptoalkyl silane esters by forming temporary addition compounds with toluene diisocyanate or with any of the other similar materials known to be capable of forming addition compounds in which the active functional groups are temporarily blocked but are readily unblocked for addition reactions at a sufficiently high temperature.

In the foregoing example, a typical rubber composition is disclosed, but other compositions differing considerably in choice of specific materials can be used with the same kind of improved results, provided that the basic material is an elastomer vulcanized at a high temperature at which the addition compound functions as though the two ingredients were separately present, and that a significant quantity of a reinforcing siliceous pigment is added.

We claim:

1. A mercapto-substituted silane adhesion promoter for bonding mineral pigments to organic plastics, essentially free from the offensive odor of the unmodified mercapto compound, having the reactivity of the mercapto group reversibly blocked by presence of at least an equivalent quantity of a material capable of a simple addition reaction to the mercapto compound.

2. The substituted silane adhesion promoter of claim 1, in which the material blocking the mercapto group is an isocyanate ester.

3. The substituted silane adhesion promoter of claim 2, in which the material blocking the mercapto group is toluene diisocyanate.

4. The substituted silane adhesion promoter of claim 3, in which the mercapto group is present as a part of 3-mercaptopropyl trimethoxy silane.

5. An essentially odorless rubber composition containing a mineral pigment to which the rubber is bonded by presence of the material specified in claim 4.

6. The process of deodorizing a mercapto substituted silane adhesion promoter which comprises reacting it with a compound capable of reversible coupling with mercapto compounds.

7. The process of claim 6 in which the compound capable of reversible coupling is an isocyanate ester.

8. The process of claim 7 in which the mercapto compound is 3-mercaptopropyl trimethoxy silane and the isocyanate ester is toluene diisocyanate.

* * * * *